(12) United States Patent
Walet

(10) Patent No.: US 12,466,648 B2
(45) Date of Patent: Nov. 11, 2025

(54) MULTI-LEVEL CONVEYING SYSTEMS FOR STORAGE FACILITIES

(71) Applicant: Lineage Logistics, LLC, Irvine, CA (US)

(72) Inventor: Daniël Walet, Oakland, CA (US)

(73) Assignee: Lineage Logistics, LLC, Irvine, CA (US)

( * ) Notice: Subject to any disclaimer, the term of this patent is extended or adjusted under 35 U.S.C. 154(b) by 382 days.

(21) Appl. No.: 18/095,428

(22) Filed: Jan. 10, 2023

(65) Prior Publication Data

US 2023/0219756 A1 Jul. 13, 2023

Related U.S. Application Data

(60) Provisional application No. 63/298,619, filed on Jan. 11, 2022.

(51) Int. Cl.
| | | |
|---|---|---|
| B65G 1/06 | (2006.01) | |
| B65G 1/04 | (2006.01) | |
| B65G 67/04 | (2006.01) | |

(52) U.S. Cl.
CPC ........... *B65G 1/065* (2013.01); *B65G 1/0485* (2013.01); *B65G 1/0492* (2013.01); *B65G 67/04* (2013.01)

(58) Field of Classification Search
CPC .... B65G 1/065; B65G 1/0485; B65G 1/0492; B65G 67/04
See application file for complete search history.

(56) References Cited

U.S. PATENT DOCUMENTS

| | | |
|---|---|---|
| 6,036,427 A | 3/2000 | Kita |
| 9,463,927 B1 | 10/2016 | Theobald |

(Continued)

FOREIGN PATENT DOCUMENTS

| | | |
|---|---|---|
| EP | 1005432 B1 | 11/2002 |
| EP | 2995579 A1 | 3/2016 |
| EP | 3112293 A2 | 1/2017 |

OTHER PUBLICATIONS

International Search Report and Written Opinion in PCT/US2023/010505 dated May 9, 2023, 15 pages.

*Primary Examiner* — Saul Rodriguez
*Assistant Examiner* — Ashley K Romano
(74) *Attorney, Agent, or Firm* — Barnes & Thornburg LLP

(57) ABSTRACT

In general, the subject matter described in this disclosure can be embodied in a multi-level pallet-conveying system for a storage facility. The conveying system includes a first-level conveying system, a first-level into-storage conveying lane adapted to receive pallets from the first-level conveying system and provide such pallets to a first-level station of a storage lifting system, and a first-level from-storage conveying lane adapted to receive pallets from the first-level station of the storage lifting system and provide such pallets to the first-level conveying system. The conveying system also includes a second-level conveying system, a second-level into-storage conveying lane adapted to receive pallets from the second-level conveying system and provide such pallets to a second-level station of the storage lifting system, and a second-level from-storage conveying lane adapted to receive pallets from the second-level station of the storage lifting system and provide such pallets to the second-level conveying system.

22 Claims, 8 Drawing Sheets

(56) References Cited

U.S. PATENT DOCUMENTS

| | | | |
|---|---|---|---|
| 9,856,083 B2 | 1/2018 | Conrad et al. | |
| 9,927,815 B2 | 3/2018 | Nusser et al. | |
| 11,629,009 B2 | 4/2023 | Eil | |
| 11,753,246 B1 | 9/2023 | Eil | |
| 11,753,247 B2 | 9/2023 | Eil | |
| 11,767,180 B1 * | 9/2023 | Dwivedi | H02K 41/031 |
| | | | 198/370.13 |
| 11,772,893 B1 * | 10/2023 | Bray | B65G 41/02 |
| | | | 414/279 |
| 12,012,282 B2 * | 6/2024 | Ahammer | B65G 1/0485 |
| 2015/0360865 A1 | 12/2015 | Massey | |
| 2017/0088355 A1 | 3/2017 | Khodl et al. | |
| 2018/0072212 A1 | 3/2018 | Alfaro et al. | |
| 2022/0184664 A1 * | 6/2022 | Porat | G05D 1/644 |
| 2022/0288787 A1 | 9/2022 | Dupree et al. | |
| 2022/0315338 A1 * | 10/2022 | Malhotra | B65G 1/1373 |
| 2023/0219756 A1 * | 7/2023 | Walet | B65G 1/065 |
| | | | 414/286 |
| 2023/0219760 A1 | 7/2023 | Eil | |
| 2023/0219761 A1 * | 7/2023 | Garifi | B65G 1/0492 |
| | | | 700/218 |
| 2024/0043215 A1 * | 2/2024 | Ahmann | B66F 11/04 |
| 2024/0067451 A1 * | 2/2024 | Kanellos | B65G 1/0492 |

\* cited by examiner

MULTI-LEVEL CONVEYING SYSTEMS FOR STORAGE FACILITIES

CROSS-REFERENCE TO RELATED APPLICATIONS

This application claims priority to U.S. Provisional Patent Application No. 63/298,619, filed on Jan. 11, 2022, which is hereby incorporated by reference in its entirety.

TECHNICAL FIELD

This document generally relates to multi-level conveying systems for storage facilities.

BACKGROUND

Some storage facilities stock food products for distribution to businesses. Such facilities may include one or more cooled rooms in which the food products are stored, enabling the food products to be stored for extended periods of time and delivered according to market demand. The food products may be stored in boxed cases, and multiple such boxed cases may be grouped together on a pallet and wrapped with plastic. Each case may include a label identifying the contents of the case, and each pallet may include a label identifying the contents of the pallet (e.g., the quantity and types of cases on the pallet). Pallets, for example, can be flat transport structures that support goods in a stable manner and that are adapted to fit forklifts and/or other warehouse equipment to move the pallets. This disclosure often refers to a pallet and the cases thereon as simply a pallet.

Lift trucks may retrieve pallets of products from truck trailers in a dock area of a facility, and deliver the pallets to storage racks, which may be located in cooled rooms. The racks may store pallets on multiple levels, for example, a ground-floor level and two levels there above. When a truck arrives with a trailer to be loaded, persons in the facility may retrieve pallets from one or more storage rooms and load the retrieved pallets into the truck trailer. In some situations, pallets may be broken down to enable persons to transfer a subset of cases on a pallet to a new pallet that is being built with cases from multiple source pallets. The built pallet may be wrapped in plastic and moved into a truck trailer, for delivery to a customer.

SUMMARY

This document describes techniques, methods, systems, and other mechanisms for conveying products in a storage facility. In general, this document describes various ways in which different types of pallet-manipulating devices may be assembled together to form a larger pallet-conveying system. Such larger pallet-conveying systems may interface with multiple levels of a storage facility using various types of pallet lifts, such as elevators and cranes.

The pallet-conveying systems may be automated, such that humans are not physically manipulating the pallets, or even making real-time decisions about how to physically manipulate pallets. Rather, various types of actuators may move the pallets according to instructions received from a computer. For example, a pallet may rest on rollers or a belt of a pallet station, and the rollers or belt may be powered to push the pallet horizontally to an adjacent pallet station, which may similarly include rollers to move the pallet. The selection of which pallets to move and where to move such pallets may be automated and determined by a warehouse control computing system.

These pallet stations may include sensors to identify when pallets are located on them, and may communicate with a central computing system to determine when to start actuating their conveyance mechanisms. Some pallet stations may form turntables that are able to turn pallets, for example, by rotating pallet or changing the direction in which the pallets are being conveyed. The decisions regarding where to move a pallet, when to move the pallet, and which route the pallet should take to get to the destination may be automatically made by a computerized warehouse control system.

Another type of pallet-conveying device includes a rail-guided vehicle that is able to shuttle pallets on a linear or looped track, picking pallets up at pallet stations and dropping them off at other pallet stations, on either side of the rail-guided vehicle. Combinations of pallet stands, rail-guided vehicles, and pallet lifts can form multi-level conveying systems that can better utilize space in a storage facility than single-level conveying systems.

Particular implementations can, in certain instances, realize one or more of the following advantages. Storage facilities can increase throughput of pallets, such as the quantity of pallets received in a given amount of time from truck trailers in a docking area and quantity of pallets delivered to the docking area for loading onto truck trailers. Combining multiple different types of conveying devices in the unique manners described in this document minimizes the amount of space required in a facility to service pallets, such as move the pallets around, break pallets apart, and weight components of pallets. This minimization of space can allow a storage building to be built with a smaller footprint, saving cost of materials and cooling costs.

Alternatively, minimizing the space needed to convey pallets around a storage facility and manipulate contents of the pallets enables a proportional increase in the amount of a storage facility that is dedicated to storage rather than conveying systems. Distributing tasks among multiple levels of a storage facility is a key feature that enables such space optimization. Such technologies also minimize not only the number of human operators required for a facility, but also the distance that human operators need to travel to inspect devices and pallets.

As additional description to the embodiments described below, the present disclosure describes the following embodiments.

Embodiment A1 is a multi-level pallet-conveying system for a storage facility, comprising a first-level conveying system adapted to move pallets on a first level of the storage facility; a first-level into-storage conveying lane adapted to receive pallets from the first-level conveying system and provide such pallets to a first-level station of a storage lifting system that is adapted to move pallets to and receive pallets from storage locations; a first-level from-storage conveying lane adapted to receive pallets from the first-level station of the storage lifting system and provide such pallets to the first-level conveying system; a second-level conveying system adapted to move pallets on a second level of the storage facility that is above the first level of the storage facility; a second-level into-storage conveying lane adapted to receive pallets from the second-level conveying system and provide such pallets to a second-level station of the storage lifting system; and a second-level from-storage conveying lane adapted to receive pallets from the second-level station of the storage lifting system and provide such pallets to the second-level conveying system.

Embodiment A2 is the multi-level pallet-conveying system of embodiment A1, wherein the storage lifting system comprises a crane that is adapted to both move pallets down an aisle and elevate pallets to any of multiple different levels along both sides of the aisle.

Embodiment A3 is the multi-level pallet-conveying system of any one of embodiments A1-A2, wherein the first-level conveying system comprises a loop and multiple vehicles that are adapted to move pallets around the loop.

Embodiment A4 is the multi-level pallet-conveying system of any one of embodiments A1-A3, wherein the second-level conveying system comprises a linear conveying system that includes a linear path and a bi-directional pallet-conveying vehicle adapted to move pallets back and forth on the linear path.

Embodiment A5 is the multi-level pallet-conveying system of embodiment A4, wherein: the loop comprises a rail loop and the multiple vehicles comprise rail-guided vehicles; and the linear path comprises a linear rail and the bi-directional pallet-conveying vehicle comprises a bi-directional rail-guided vehicle.

Embodiment A6 is the multi-level pallet-conveying system of any one of embodiments A1-A5, comprising: an inbound conveying lane that is adapted to receive pallets from human-operated pallet-moving vehicles with access to docked trailers and provide such pallets to the multiple vehicles of the first-level conveying system; an outbound conveying lane that is adapted to receive pallets from the multiple vehicles of the first-level conveying system and provide such pallets to human-operated pallet-moving vehicles with access to docked trailers.

Embodiment A7 is the multi-level pallet-conveying system of any one of embodiments A1-A6, comprising a conveying-system lift adapted to move pallets between the first level of the storage facility and the second level of the storage facility, the conveying-system lift including a first-level conveying-system lift station adapted to receive pallets from the first-level conveying system and a second-level conveying-system lift station adapted to receive pallets from the second-level conveying system.

Embodiment A8 is the multi-level pallet-conveying system of embodiment A7, wherein the first-level conveying-system lift station is located on the first level of the storage facility within the loop of the first-level conveying system.

Embodiment A9 is the multi-level pallet-conveying system of embodiment A8, wherein: the second-level into-storage conveying lane interfaces with the path of the second-level conveying system on a first side of the second-level conveying system; the second-level from-storage conveying lane interfaces with the path of the second-level conveying system on the first side of the second-level conveying system; and the second-level conveying-system lift station is located on a second side of the path of the second-level conveying system, the second side of the path being opposite the first side of the path.

Embodiment A10 is the multi-level pallet-conveying system of any one of embodiments A1-A9, wherein: the second-level into-storage conveying lane is located directly above the first-level into-storage conveying lane; and the second-level from-storage conveying lane is located directly above the first-level from-storage conveying lane.

Embodiment 11 is the multi-level pallet-conveying system of any one of embodiments A1-A10, comprising: a wall that separates a storage portion of the storage facility from a docking portion of the storage facility, to maintain the storage portion of the storage facility at a first atmospheric temperature and the docking portion of the storage facility at a second atmospheric temperature that is higher than the first atmospheric temperature; the first-level into-storage conveying lane passes through a first opening in the wall; the first-level from-storage conveying lane passes through a second opening in the wall; the second-level into-storage conveying lane passes through a third opening in the wall; the second-level from-storage conveying lane passes through a fourth opening in the wall.

Embodiment A12 is the multi-level pallet-conveying system of embodiment A11, wherein: the first atmospheric temperature is below freezing; and the second atmospheric temperature is above freezing, and at least fifteen degrees above the first atmospheric temperature.

Embodiment B1 is a pallet-conveying system for a storage facility, comprising: a linear conveying system that includes a linear path and a bi-directional pallet-conveying vehicle adapted to move pallets back and forth on the linear path; a storage conveying system adapted to move pallets between the linear path and a storage portion of the facility, the storage conveying system including multiple interfacing stations positioned along the linear path at which the storage conveying system is adapted to receive pallets from and provide pallets to the bi-directional pallet-conveying vehicle of the linear conveying system, the multiple interfacing stations of the storage conveying system being located along a first side of the linear path that is served by a first side of the bi-directional pallet-conveying vehicle; a lift station adapted to interface with a lift that travels vertically between different levels of the storage facility, including a particular level at which the lift station is located, the lift station being located on a second side of the linear path that is opposite the first side of the linear path; and a lift-providing conveying lane adapted to move pallets to the lift station from a receiving station that is part of the lift-providing conveying lane and that is adapted to receive pallets from the bi-directional pallet-conveying vehicle of the linear conveying system.

Embodiment B2 is the pallet-conveying system of embodiment B1, wherein: the linear path comprises a rail; and the bi-directional pallet-conveying vehicle comprises a rail-guided vehicle.

Embodiment B3 is the pallet-conveying system of any one of embodiments B1-B2, comprising: a lift-receiving conveying lane adapted to move pallets away from the lift station; a transfer conveying lane adapted to receive pallets from the lift-receiving conveying lane and move such pallets to a destination system.

Embodiment B4 is the pallet-conveying system of embodiment B3, comprising: a return conveying lane that is adapted to receive pallets from the destination system and move such pallets to the linear conveying system.

Embodiment B5 is the pallet-conveying system of embodiment B4, comprising: a rework conveying lane that is adapted to receive pallets from the return conveying lane that do not satisfy criteria for proceeding to the linear conveying system, and provide such pallets to the transfer conveying lane.

Embodiment B6 is the pallet-conveying system of any one of embodiments B1-B5, wherein the storage conveying system includes: an into-storage conveying lane adapted to receive pallets from the linear conveying system; an into-storage routing station adapted to receive pallets from the into-storage conveying lane and selectively provide such pallets to either of a first lifting system and a second lifting system; a from-storage routing station adapted to selectively receive pallets from either of the second lifting system and a third lifting system; and a from-storage conveying lane adapted to receive pallets from the from-storage routing station and provide such pallets to the linear conveying system.

Embodiment B7 is the pallet-conveying system of embodiment B6, wherein the storage conveying system includes: a second into-storage conveying lane adapted to receive pallets from the linear conveying station at a different location than the into-storage conveying lane; a second into-storage routing station adapted to receive pallets from the second into-storage conveying lane and selectively provide such pallets to either of the third lifting system and a fourth lifting system; a second from-storage routing station adapted to selectively receive pallets from either of the fourth lifting system and a fifth lifting system; and a second from-storage conveying lane adapted to receive pallets from the second from-storage routing station and provide such pallets to the linear conveying system.

Embodiment B8 is the pallet-conveying system of any one of embodiments B6-B7, wherein: the first lifting system comprises a first crane that is adapted to both move pallets down a first aisle and elevate pallets to any of multiple different levels along the first aisle; the second lifting system comprises a second crane that is adapted to both move pallets down a second aisle and elevate pallets to any of the multiple different levels along the second aisle; and the third lifting system comprises a third crane that is adapted to both move pallets down a third aisle and elevate pallets to any of the multiple different levels along the third aisle.

Embodiment B9 is the pallet-conveying system of any one of embodiments B1-B8, wherein the particular level is above a ground-floor level of the storage facility.

Embodiment B10 is the pallet-conveying system of any one of embodiments B1-B9, wherein the linear conveying system includes a second bi-directional pallet-conveying vehicle adapted to move pallets back and forth on the linear path.

Embodiment C1 is a lift-interfacing system for a storage facility, comprising: a first lift station adapted to interface with a first lift that travels vertically between different levels of the storage facility, including a particular level at which the first lift station is located; a second lift station adapted to interface with a second lift that travels vertically between the different levels of the storage facility, including the particular level at which the second lift station is located; a first lift-receiving conveying lane adapted to receive pallets brought to the first lift station by the first lift; a second lift-receiving conveying lane adapted to receive pallets brought to the second lift station by the second lift; a common transfer conveying lane adapted to transfer pallets from both of the first lift-receiving conveying lane and the second lift-receiving conveying lane to a destination system; a common return conveying lane adapted to return pallets from the destination system to both of the first lift station and the second lift station.

Embodiment C2 is the lift-interfacing system of embodiment C1, comprising: a first lift-providing conveying lane adapted to receive pallets from the common return conveying lane and provide such pallets to the first lift-station; and a second lift-providing conveying lane adapted to receive pallets from the common return conveying lane and provide such pallets to the second lift-station.

Embodiment C3 is the lift-interfacing system of embodiment C2,wherein: the first lift-providing conveying lane interfaces with an intermediate position of the common return conveying lane; and the second lift-providing conveying lane interfaces with an end of the common return conveying lane.

Embodiment C4 is the lift-interfacing system of any one of embodiments C2-C3, wherein: the first lift-receiving conveying lane interfaces with an intermediate position of the common transfer lane; and the second lift-receiving conveying lane interfaces with an end of the common transfer conveying lane.

Embodiment C5 is the lift-interfacing system of any one of embodiments C1-C4, wherein: the first lift-receiving conveying lane includes a first rework station structured to provide human access to and manipulation of pallets received at the first rework station; and the second lift-receiving conveying lane includes a second rework station structured to provide human access to and manipulation of pallets received at the second rework station.

Embodiment C6 is the lift-interfacing system of embodiment C5, comprising an elevated floor located between the first rework station and the second rework station to place human feet at a base of pallets located at the first rework station and the second rework station.

Embodiment C7 is the lift-interfacing system of any one of embodiments C1-C6, comprising: a rework lane adapted to receive pallets from the common return conveying lane and provide such pallets to the common transfer lane.

Embodiment C8 is the lift-interfacing system of embodiment C7, wherein: the rework lane interfaces with intermediate position of the common return lane; the common return lane includes a return-routing station at the intermediate position of the return lane, the return-routing station adapted to selectively route pallets to either of the rework lane and an end portion of the common return lane based on whether pallets at the return-routing station satisfy criteria, the end portion of the common return lane adapted to provide pallets to both of the first lift station and the second lift station.

Embodiment C9 is the lift-interfacing system of embodiment C8, wherein the criteria includes a pallet being within size constraints.

Embodiment C10 is the lift-interfacing system of any one of embodiments C1-C9, wherein the particular level is above a ground-floor level of the storage facility.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes different types of conveying systems for storage facilities. For example, this document describes how pallet-conveying devices can be aggregated to move pallets not only horizontally around a facility, but also vertically in order to maximize space utilization and limit the distance that human operators need to travel to interface with pallets. The figures described below and throughout this disclosure describe many such conveying systems, which can work together in a storage facility to move pallets.

Figure 1:
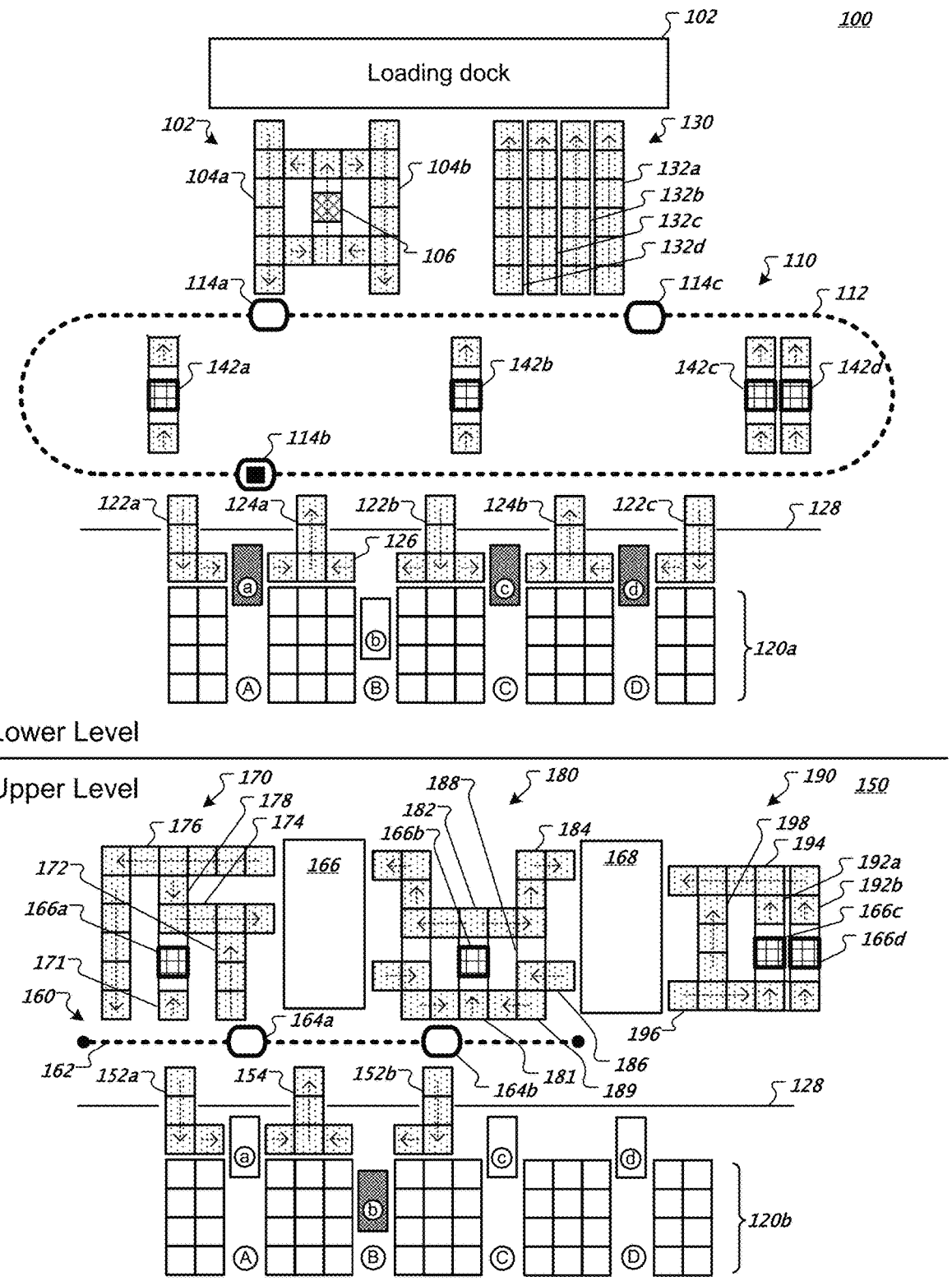
FIG. 1 shows a simplified diagram of conveying systems in a storage facility.

FIG. 1 shows a simplified diagram of conveying systems in a storage facility. The storage facility includes at least two levels, a lower level 100 and an upper level 150 (in some implementations, there may be one or more additional levels of conveying systems). This discussion will begin by discussing operations that occur on the lower level 100.

Pallets are received into the storage facility via tractor trailers that dock at a loading dock 102. Human-operated lift trucks (e.g., forklifts) retrieve pallets from trailers, move such pallets across the loading dock 102, and place the pallets into an inbound conveying system 102. The inbound conveying system 102 includes two inbound conveying lanes 104a-b. The inbound conveying lanes 104a-b each include multiple pallet stations that can manipulate pallets in different manners, with FIG. 1 illustrating each pallet station with a shaded square. The inbound conveying lanes 104a-b each include a receiving station proximate the loading dock 102, with the receiving stations each adapted to receive pallets from lift trucks and then convey such received pallets forward to a remainder of the inbound conveying lanes 104a-b (e.g., with rollers, belts, or other types of motorized conveyance devices).

Pallets are analyzed by sensors (e.g., cameras and laser curtains) as they are moved forward along the inbound conveying lanes 104a-b, and should those pallets satisfy criteria (e.g., size constraints and presence of appropriate labels), then the pallets are routed to providing stations at the end of the inbound conveying lanes 104a-b. Should a pallet not satisfy the criteria, a routing station that is located just before the end of the inbound conveying lane can route the non-conforming pallet inward along a rework conveying lane toward a middle of the inbound conveying system at which a rework station for both conveying lanes 104a-b is located.

A routing station is a pallet station that can route a pallet to either of two or three different destination pallet stations, or that can receive a pallet from any of two or three different inbound pallet stations. A turntable is an example type of routing station.

A rework station is a station at which pallets stop and which provide human access to and manipulation of such pallets. A rework station may include and/or be surrounded by a platform that is raised off the ground to place human feet of the human workers level with a bottom of any pallet located at the rework station. Human workers may be able to walk entirely around a pallet located at a rework station to rework the pallet (e.g., restack cases, apply a new label). After a pallet has been reworked, a worker can press a button to inform the warehouse control system that the pallet is ready to leave the rework station, and the inbound conveying system 102 then routes the pallet back into either of the inbound conveying lanes 104a-b, where the pallets can be analyzed again by sensors to determine whether the pallet satisfies the criteria for proceeding past the inbound conveying system 102.

A loop conveying system 110 is adapted to receive pallets from the ends of the inbound conveying lanes 104a-b and deliver those pallets to the into-storage conveying lanes 122a-c. The loop conveying system 110 is depicted in FIG. 1 as including a looped path 112 and multiple pallet-moving vehicles 114a-c that travel around the looped path. In the FIG. 1 illustration, each vehicle can pick up and transport a single pallet at a time, as depicted by the solid block inside vehicle 114b, although vehicles that can move multiple pallets at a time may be employed. Each vehicle is automatically and individually controlled around the path 112 by a computing system, such that the vehicles can move and stop at different times and the distance between the vehicles can change. The vehicles may not be able to overtake each other (except when moving onto a side, spur path which is not illustrated in FIG. 1), and all vehicles may move in the same counter-clockwise direction about the looped path (although in various implementations the vehicles may all move clockwise). The looped path 112 may be a rail, and the vehicles 114a-c may be rail-guided vehicles. The looped path 112 can be a portion of floor reserved for vehicle movement, and on which the vehicles 114a-c move (e.g., with the vehicles 114a-c including tires that move across concrete of the floor).

Transferring pallets from a conveying lane to a vehicle, and from a vehicle to a conveying lane can be a cooperative process between both the providing pallet station and the pallet-moving vehicle. For example, once a pallet has been moved down the inbound conveying lane 104a to a providing station at the end of the lane, and once a vehicle 114a has arrived at the providing station, the providing station may actuate rollers to move the pallet onto the vehicle at the same time that rollers on the vehicle turn to receive the pallet. In some examples, the vehicle includes lifting forks that extend under a pallet located at a providing station, to lift the pallet and pull it back to the receiving vehicle.

Each of the into-storage conveying lanes 122a-c is adapted to receive pallets (one at a time) from the vehicles of the loop conveying system 110, and move those pallets through openings in wall 128 toward the "lift stations" of lifts that are labelled in FIG. 1 as "a", "b", "c", and "d". For example, at an end of the into-storage conveying lane 122b is a routing station that is able to route a received pallet to either of lifts "b" or "c".

The four lifts "a"-"d" each serve a corresponding aisle "A", "B", "C", and "D", down which the lift or a component thereof may traverse in order to deliver pallets to storage locations 120a (each storage location is illustrated as an empty square in FIG. 1). In some examples, each lift includes a crane that is able to move down an aisle and up to a computer-specified location, to deliver a pallet. Once the crane has moved to the computer-specified location (e.g., 18 locations down the row, and 5 locations up), a "mole" vehicle on which the pallet is located can traverse horizontally off the crane and into the racks to deliver the pallet. The mole vehicle may drop off the pallet and then return to the crane.

In some implementations, a storage facility may employ a lifting elevator that interfaces with an aisle cart on each level instead of a crane, with some differences from cranes being that lifting elevators are stationary do not travel down an aisle as cranes do, and that a lifting elevator can work in conjunction with a separate aisle cart for each level such that an elevator can have multiple aisle carts versus a crane having a single "mole" cart. Although the term "elevator" is used in this disclosure to reference a stationary lift (in distinction to a crane that can move horizontally), these elevators may not be enclosed.

Once a crane has dropped off a pallet, the crane may move to a different storage location to retrieve a different pallet, bring that pallet to the lift station, at which the pallet is transferred to a from-storage conveying lanes. For example, lift "b" can transfer a pallet to conveying lane 126, which interfaces with a turntable to route the pallet to from-storage conveying lane 124a. FIG. 1 shows that each of the from-storage conveying lanes 124a-b serves two lifts. Specifically, from-storage conveying lane 124a interfaces with a routing station that receives pallets from each of two different conveying lanes that themselves receive pallets from lifts "a" and "b".

Pallets that are received from storage by the lifts "a"-"d" are transferred to vehicles 114a-c of the loop conveying system 110, where those pallets are moved to either (1) the outbound conveying system 130, or (2) any of elevator lift stations 142a-d. The outbound conveying system 130 includes multiple outbound conveying lanes 132a-d that are each arranged to queue pallets for loading onto truck trailers. For example, a single outbound conveying lane 132a may queue several pallets for designated for transfer to a single truck trailer. One or more lift trucks may then retrieve the pallets from the outbound conveying lane 132a and move those pallets across the loading dock 102 to the appropriate truck trailer.

The warehouse control system decides to transfer pallets to an upper level of the storage facility by lifts that are located in the middle of the loop conveying system 110. For example, FIG. 1 illustrates four lower-level lift stations 142a-d that are located in the middle of the loop conveying system 110, at which pallets can be received onto corresponding lifts that move the pallets vertically upwards to corresponding upper-level lift stations. Each of the lower-level lift stations 142a-d are illustrated in FIG. 1 as including a lift-providing conveying lane that receives pallets from vehicles 114a-c and provides the pallets to the corresponding lift station, and a lift-receiving conveying lane that receives pallets from the corresponding lift and provides the pallets to the vehicles 114a-c.

As will be discussed in additional detail below, the warehouse control system can alternatively transfer pallets to the upper level by having the lifts "a"-"d" to deliver a pallet to an outbound conveying lane that is located at the second level, rather than the first-level outbound conveying lanes 124a-b.

The bottom portion of FIG. 1 depicts the upper level 150 of the storage facility. This depiction of the storage facility also shows different, second-level storage locations 120b that are located above the first-level storage locations 120a. In fact, there may be multiple levels of storage locations on the lower level 100 and multiple levels of storage locations on the upper level 150, because pallets may not be as tall as each of the levels 100 and 150.

As with the lower level, lifts "a"-"d" are able to provide pallets to and receive pallets from the storage locations 120b. A unique feature of the system depicted in FIG. 1 is that there are into-storage conveying lanes 152a-b and a from-storage conveying lane 154 on the upper level, and not just on the lower level. The operation of these conveying lanes is similar to those of the lower level and are even located directly above corresponding lower-level conveying lanes 122a-b and 124a, just that there are fewer such upper-level conveying lanes. For example, there are no into-storage or from-storage conveying lanes on the upper level, above lanes 124b and 122c.

The lifts "a"-"d" are also illustrated in the FIG. 1 depiction of the upper level 150, it is just that lifts "a", "c", and "d" are not shaded in, indicating that the lifts are positioned at the shown locations but at a different level. Indeed, FIG. 1 illustrates lift "b" as shaded in the depiction of the upper level 150, indicating that lift "b" is has risen to the upper level in the FIG. 1 illustration. The aisles "A"-"D" are also shown in the FIG. 1 depiction of the upper level 150, and indeed the aisles may extend above the upper level 150 to a roof of the facility. For example, the lower level 100 may be located at ground level, with the pallet stands and pallet-moving vehicles supporting and moving pallets at approximately chest height (e.g., one meter off the ground). While the second level 150 may be located six meters off the ground, the height of the portion of the storage facility in which pallets are stored may extend thirty or more meters into the air, with pallet storage locations located almost entirely to the ceiling and the lifts "a"-"d" able to serve an entire length and height of the aisles "A"-"D".

The into-storage conveying lanes 152a-b and from-storage conveying lane 154 interface with a second-level conveying system 160, which can include multiple pallet-moving vehicles 164a-b that traverse linearly back and forth across linear path 162. The linear path 162 may include a linear rail, and the multiple pallet-moving vehicles 164a-b may be rail-guided vehicles. The second-level pallet-moving vehicles 164a-b may be similar to the first-level pallet-moving vehicles 114a-c, although the second-level pallet-moving vehicles may not travel in a loop, and may move both directions along the path on which they operate.

The upper level 150 includes multiple pallet-manipulation systems 166 and 168 that are adapted to manipulate pallets, for example, by taking layers of cases from the pallet and/or adding layers of cases to pallets. The pallet-manipulation system 166 is serviced by a left-most conveying system 170 and a middle conveying system 180, while the pallet-manipulation system 168 is serviced by the middle conveying system 180 and the right-most conveying system 190.

Purposes of the conveying systems 170, 180, and 190 include receiving pallets from one or more of the first and second levels, providing the pallets to the pallet-manipulation systems 166 and 168, receiving pallets from the pallet-manipulation systems 166 and 168, wrapping pallets received from the pallet-manipulation systems 166 and 168, determining whether the wrapped pallets satisfy criteria for leaving the conveying systems 170, 180, and 190, and providing pallets to lower-level or upper-level conveying systems if the pallets satisfy the criteria. If the pallets do not satisfy the criteria, the conveying systems 170, 180, and 190 are adapted to route pallets back to a pallet-manipulation system.

The left-most conveying system 170 is adapted to receive pallets from both: (1) the left-most lift (at second-level lift station 166a), and (b) the second-level pallet-moving vehicles 164a-b, which may receive pallets from the second-level from-storage conveying lane 152. As such, the left-most conveying system 170 may receive pallets from storage through at least two main routes: (1) by a lift retrieving a pallet from storage (e.g., lift "b"), depositing that pallet for conveying by a lower-level from-storage conveying lane (e.g., lane 124a), a lower-level pallet-moving vehicle receiving the pallet and then providing the pallet to lift station 142a, and the lift raising the pallet to lift station 166a; and (2) by a lift retrieving a pallet from storage (e.g., lift "b"), depositing that pallet for conveying by an upper-level from-storage conveying lane (e.g., lane 152), and an upper-level pallet-moving vehicle receiving the pallet and then providing the pallet to a receiving station for the left-most conveying system 170.

Pallets received at the second-level lift station 166a are conveyed by the lift station forward toward the transfer conveying lane 174, which conveys such pallets to the pallet-manipulation system 166. Pallets received from the second level linear-conveying system 160 are received by a receiving station at a front of the conveying lane 172. The conveying lane 172 moves pallets along and provides such pallets to a middle portion of the transfer conveying lane 174, which then conveys such pallets to the pallet-manipulation system 166.

The left-most conveying system 170 receives pallets from the pallet-manipulation system 166 with a return conveying lane 176. The return conveying lane 176 may include a pallet wrapping station and sensors to determine whether wrapped pallets satisfy criteria for leaving the conveying system 170. Should a pallet satisfy criteria for leaving the conveying system 170, the return conveying lane 176 provides the pallet to a pallet-moving vehicle of the second-level linear-conveying system 160. The second-level pallet-moving vehicle can route the pallet to storage either: (1) by dropping the pallet off at the receiving station 171 so that the left-most lift can take the pallet to the first floor where the pallet will be routed to a storage lift, or (2) by dropping the pallet off at one of the second-level into-storage lanes 152*a*-*b*.

Should a pallet not satisfy criteria for leaving the conveying system 170, a routing station may route the pallet to a rework lane 178. The rework lane 178 may include a rework station at which human workers can interact with the pallet in an effort to make the pallet satisfy criteria for leaving the conveying system. The rework lane 178 may then provide the pallet to the transfer lane 174, which can provide the pallet to the pallet-manipulation system 166. The pallet-manipulation system 166 may route the pallet to the return lane 176 without manipulating the pallet, at which the criteria-analysis process may repeat.

The middle conveying system 180 is adapted to service multiple pallet-manipulating systems 166 and 168. Like the left-most conveying system 170, the middle conveying system 180 is adapted to receive pallets via both the middle lift (at upper-level lift station 166*b*) and via the linear conveying system 160. Pallets received via the upper-level lift station 166*b* are provided to a routing station 182, which routes the pallet either left or right (in FIG. 1), depending on whether the computing system has designated a destination for the pallet as being the pallet-manipulating system 166 (to the left) or the pallet-manipulating system 168 (to the right).

Assuming that the pallet is destined for the pallet-manipulating system 168 and is routed to the right, the pallet is conveyed rightward by a conveying system, then upward by another conveying system, and finally to the pallet-manipulating system 168 by a final transfer conveying system 184.

The middle conveying system 180 receives pallets from the pallet-manipulating system 168 using the return lane 186. The return lane 186 may include a pallet-wrapping station and sensors to determine whether the received pallet satisfies criteria for leaving the middle conveying system 180. Similar to with the left-most conveying system 170, if the pallet does not satisfy the criteria, a routing station transfers the pallet "upwards" (in FIG. 1) to a rework lane 188, at which human workers are able to interact with the pallet. Then the reworked pallet is conveyed back to the pallet-manipulating system 168 by the transfer lane 184.

Should the pallet satisfy the criteria, the routing station transfers the pallet "downwards" (in FIG. 1) to station 189, which is adapted to selectively: (1) route the pallet left (in FIG. 1) towards the lift station 166*b*, for the pallet to be moved to the lower level, or (2) provide the pallet to a pallet-moving vehicle of the linear-conveying system 160. As such, the middle conveying system 180 is able to return pallets to storage via an opening in the wall 128 in the lower level or an opening in the wall 128 in the upper level.

The middle conveying system 180 is symmetric about a center, vertical axis, such that the description of components in a right side of the middle conveying system 180 applies equally to corresponding components on the left side of the middle conveying system 180. The common components that are shared among both the left and right sides of the middle conveying system 180 include: (1) the lift station 166*b*, (2) the receiving lane 181 that is adapted to receive pallets from both the linear conveying system 160, and pallets being returned from the pallet-manipulating systems 166 and 168, and (3) the routing station 182 that is adapted to selectively route pallets to either of the pallet manipulating system 166 and the pallet manipulating system 168 (the "destination" systems).

The right-most conveying system 150 is different from the left-most conveying system 170 and the middle conveying system 180, in that the second-level linear conveying system 160 does not extend to the right-most conveying system and does not interface with the right-most conveying system. Rather, the right-most conveying system 150 is served by two lifts and therefore includes two lift stations 166*c*-*d*.

Pallets received at lift stations 166*c*-*d* are transferred "upwards" (in FIG. 1) to lift-receiving stations 192*a*-*b*, which provide the pallets to a common transfer lane 194. The common transfer lane 194 transfers pallets from the lift-specific conveying lanes down a single, common lane to the pallet-manipulating system 168.

The return lane 196 of the right-most conveying system 150 receives pallets from the pallet-manipulating system 168. The return lane 196 may include a pallet wrapping station and sensors for use in determining whether the wrapped pallet satisfies criteria for leaving the right-most conveying system 190.

Should the pallet satisfy the criteria, a routing station in the return lane 196 routes the pallet to the right (in FIG. 1) to be provided to either of the lift stations 166*c*-*d*, so that the pallets can be moved vertically downward by corresponding lifts. Should the pallet not satisfy the criteria, the routing station can route the pallet "upwards" (in FIG. 1) to a rework lane 198. The rework lane can include a rework station at which human workers can walk around the pallet and manipulate the pallet. As with the left-most conveying system 170 and the middle conveying system 180, once a pallet has been reworked, it can be moved onto the transfer conveying lane 194 to be provided back to the pallet-manipulating system 168 (which may immediately provide the pallet to the return lane 196).

Figure 2A:
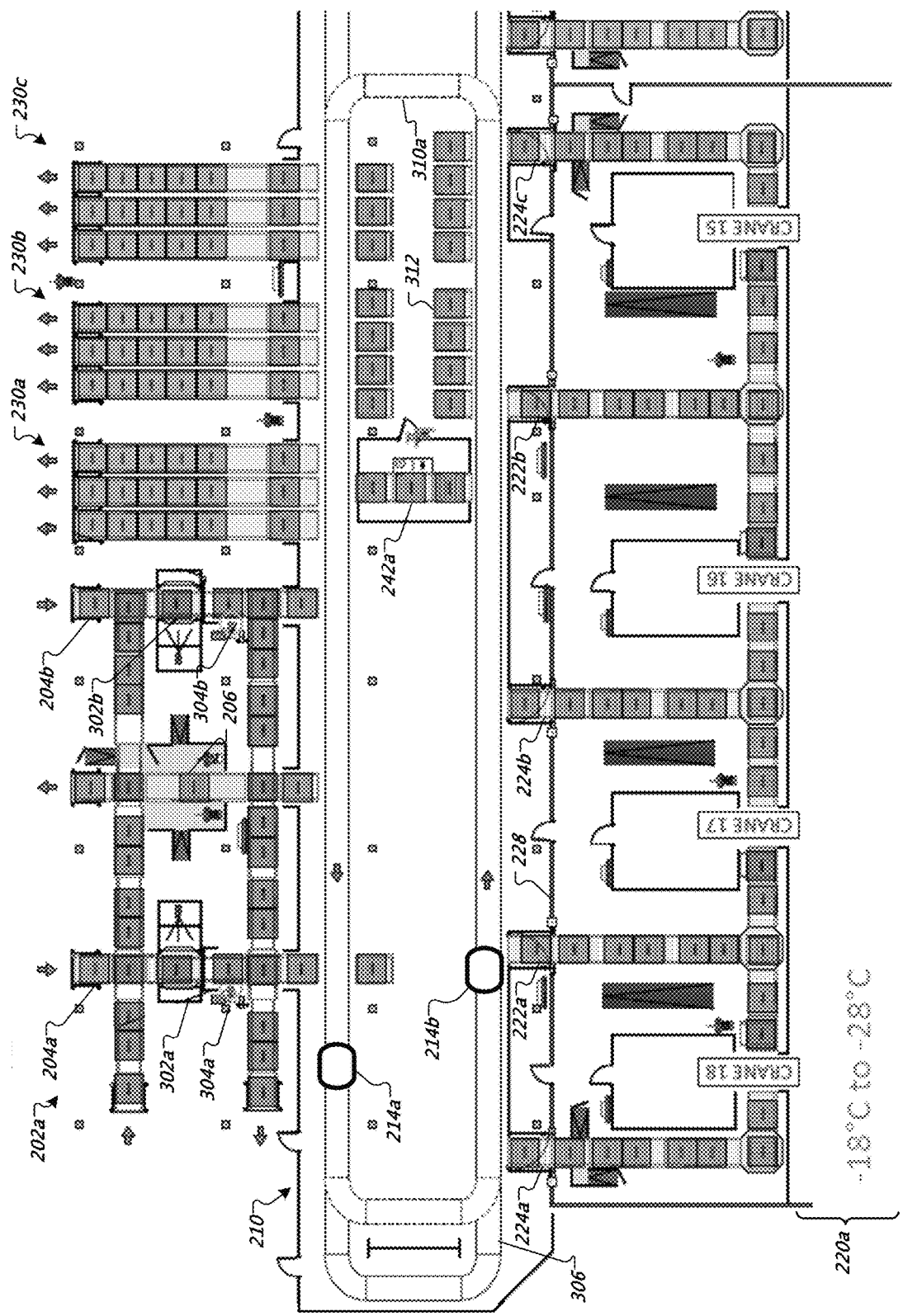
FIG. 2A-B depict portions of a lower level of the storage facility in detail.
Figure 2B:
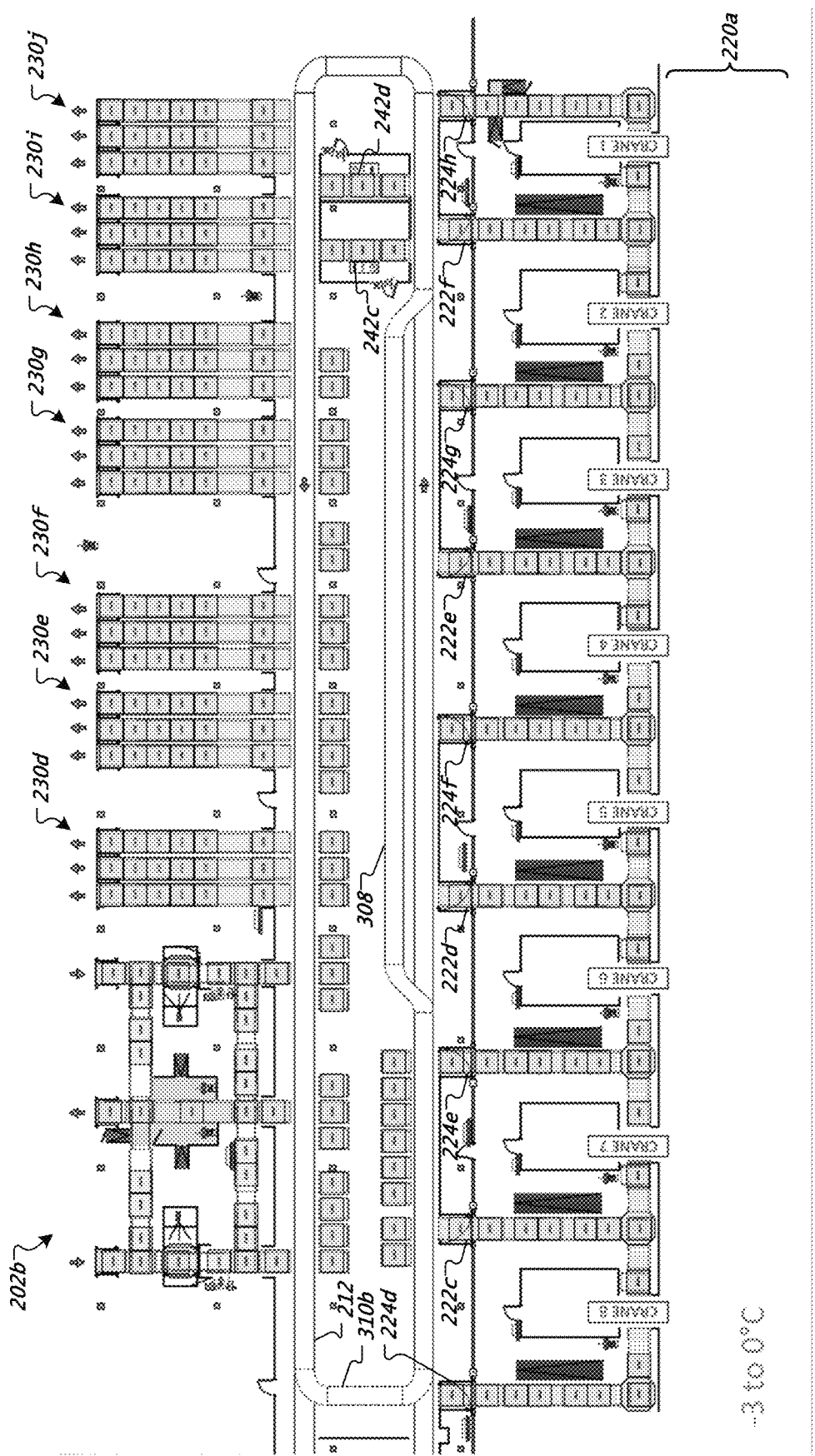
Figure 3A:
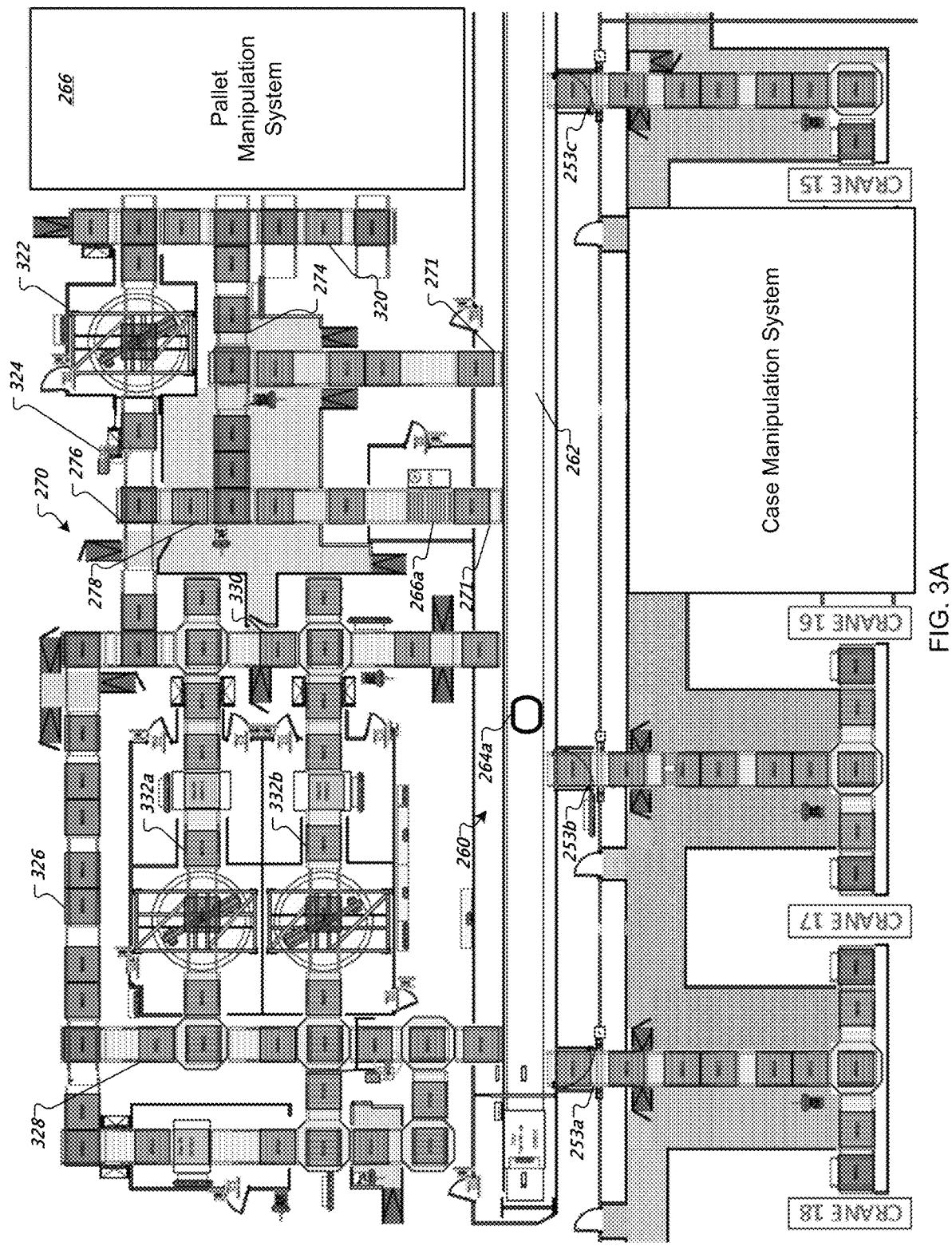
FIG. 3A-C depict portions of an upper level of the storage facility in detail.
Figure 3B:
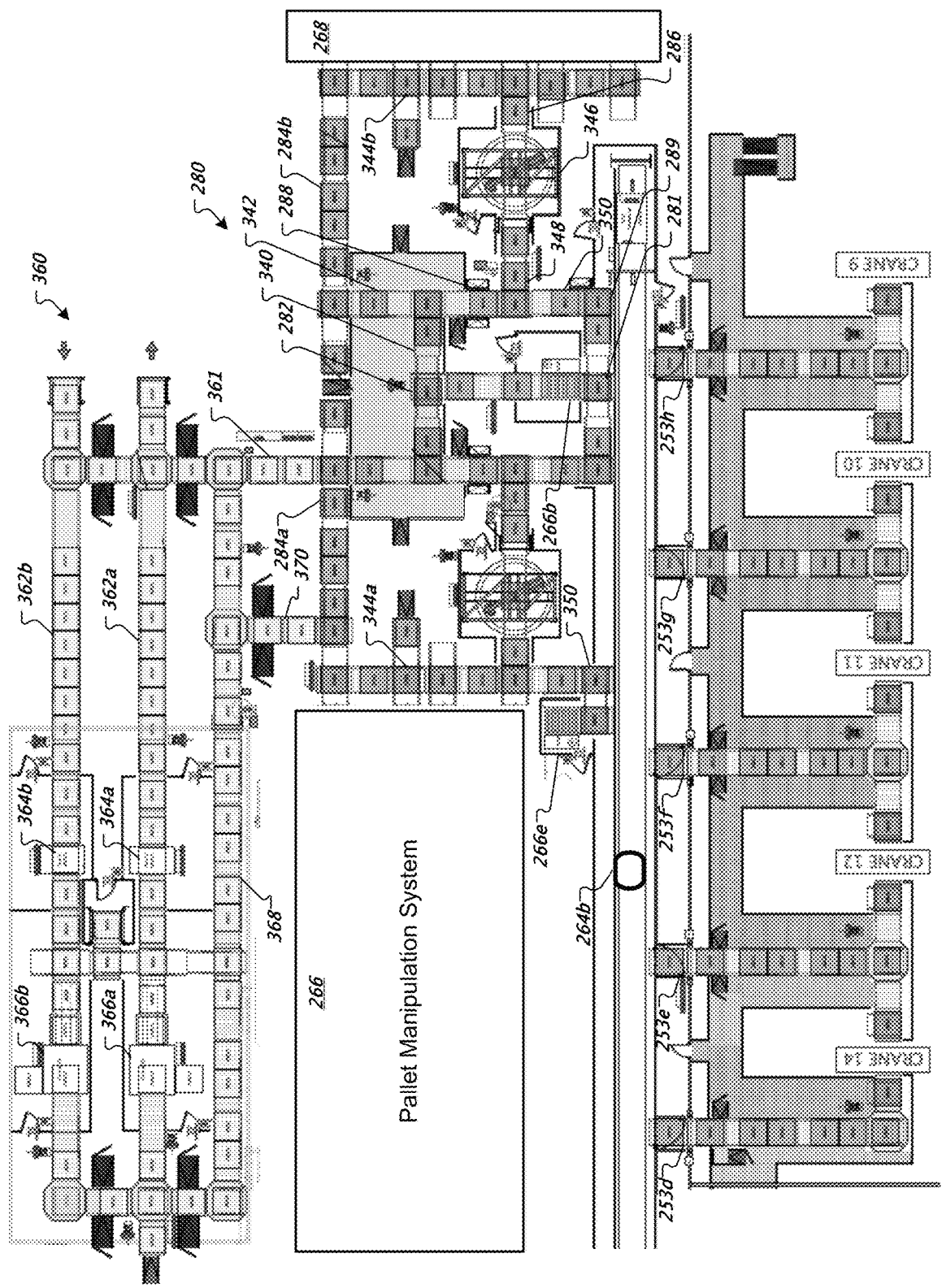
Figure 3C:
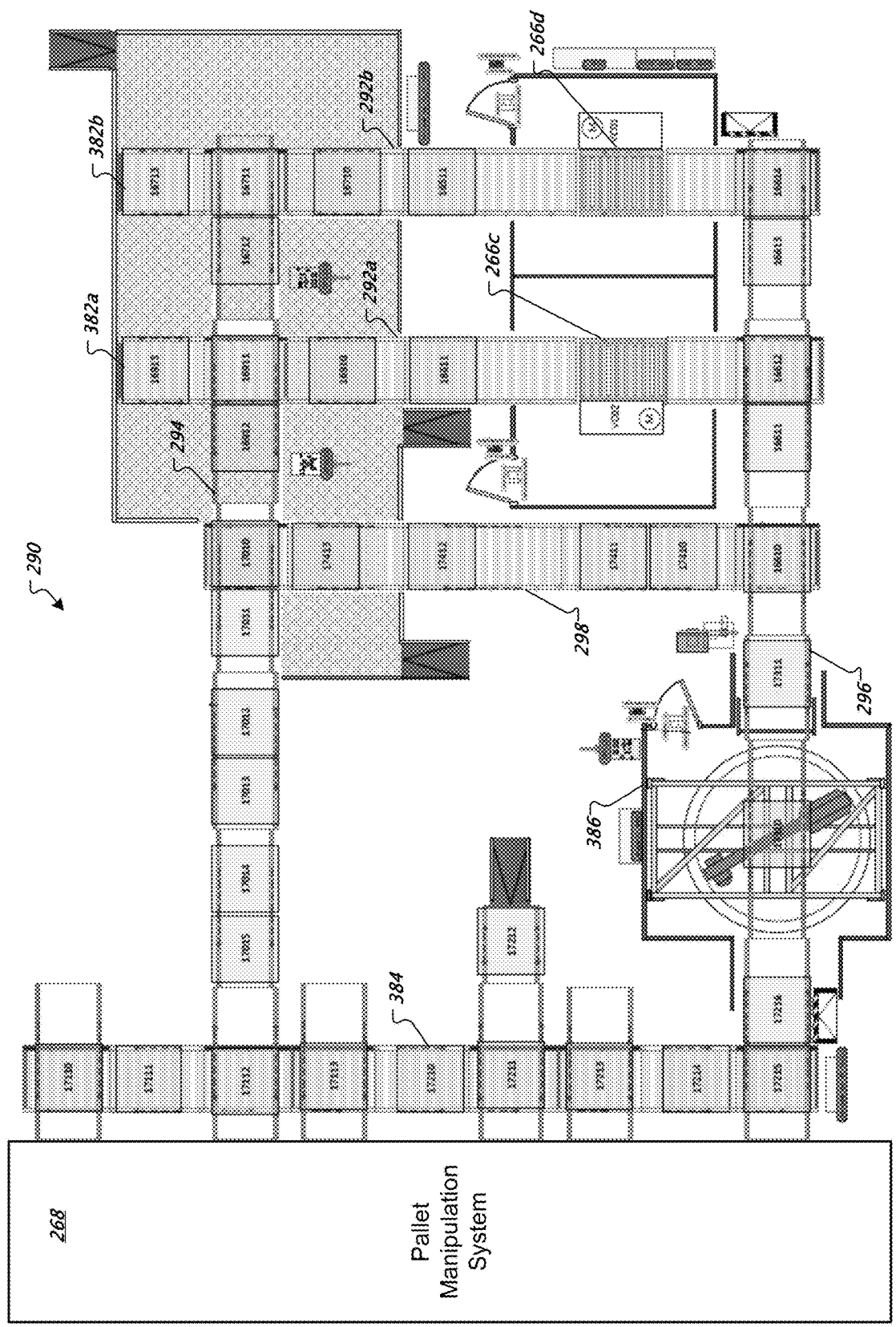

FIGS. 2A-B depict portions of a lower level of a storage facility, from which the simplified diagram of FIG. 1 was generated. Similarly, FIGS. 3A-C depict portions of an upper level of the same storage facility. Reference numbers are used in FIGS. 2A-B and 3A-C with the form "2XX" to represent components that correspond to similarly-numbered components from FIG. 1. For example, the reference number "102" in FIG. 1 references an inbound conveying system, while the reference numbers "202*a*-*b*" in FIG. 2 reference two similar inbound conveying systems. As such, discussion of components with respect to FIG. 1 applies to the similarly-numbered components in FIGS. 2A-B and 3A-C. Reference numbers with the form "3XX" represent features introduced in the discussion of FIGS. 2A-B and 3A-C that may not have a corresponding reference number from FIG. 1. The diagrams in FIGS. 2A-B and 3A-C show more detail than FIG. 1, as explained below.

Like with FIG. 1, pallets are unloaded from truck trailers by lift trucks, and the pallets are placed into inbound conveying lanes 204a-b of inbound conveying systems 202a-b. As such, there are two inbound conveying systems in FIGS. 2A-B, versus the one in FIG. 1. The inbound conveying systems 202a-b in FIGS. 2-B include additional pallet stands with respect to the FIG. 1 equivalent. The inbound conveying systems 202a-b include stations 302a-b at which a camera takes a picture of a pallet at the station (e.g., each of stations 302a-b may include a turntable that rotates the pallet around a z-axis, so that images can be captured of the pallet from various sides/angles). The inbound conveying systems 202a-b also include stations 304a-b at which a laser curtain measures the exterior dimensions of a pallet passing through the laser curtain. Measurements from these sensors are used to determine whether the pallet is reworked at the rework station 206, which is shown in FIGS. 2A-B with a surrounding raised platform on which human workers may walk.

The loop conveying system 210 receives pallets from the inbound conveying systems 202a-b that satisfy the criteria. A difference from FIG. 1 is that the loop conveying system 210 includes a side maintenance loop 306 at which vehicles 214a-b may be serviced, and a parking loop 308 at which vehicles may sit when demand is low. Another difference from FIG. 1 is that the loop conveying system 210 includes shortcut loops 310a-b that vehicles 214a-b are able to take if it is unnecessary to loop all the way to the end, given a particular task that a vehicle is currently-assigned to perform (e.g., drop off a pallet at a destination location, or pick up a pallet at an origination location). Two vehicles 214a-b are shown, but the loop conveying system 210 may include many such vehicles.

The lift stations 242a-d are similar to those depicted in FIG. 1, including a single pallet station for queuing a pallet headed to the lift, and including a single pallet station for receiving a pallet from the lift. The lift-providing and lift receiving conveying lanes can be longer than a single pallet station.

The to-storage conveying lanes 222a-f and the from-storage conveying lanes 224a-h are similar to those from FIG. 1, except that the lanes are longer and there are more of them (and more cranes).

Inside of the loop conveying system 210 are temporary storage pallet stations 312, which the warehouse management system may use to store pallets temporarily before delivering the pallet to its final destination (e.g., because the destination of a particular pallet is not yet available, and because other pallets were starting to queue up behind the particular pallet at its original location at which the particular pallet was waiting for a loop vehicle).

FIGS. 2A-B also show how the storage area is formed of two rooms. A first room (shown in FIG. 2A) is maintained within an atmospheric temperature range from −18 degrees centigrade to −28 degrees centigrade. A second room (shown in FIG. 2B) is maintained within an atmospheric temperature range from −3 degrees centigrade to 0 degrees centigrade. The docking area (including the loop conveying system 210) may be maintained at 0 degrees centigrade to 4.4 degrees centigrade.

As already mentioned, the upper floor of the storage facility that is shown in FIGS. 3A-C is similar to the upper floor 150 that is depicted in FIG. 1. For example, FIGS. 3A-B show lifts and conveying lanes 253a-h that are similar to the lifts and conveying lanes 152a-b and 154 of FIG. 1. A difference is that the conveying lanes 253a-h may be bi-directional, although in some examples, the conveying lanes 253a-h alternate between inbound and outbound assignments, as with the FIG. 1 lanes.

The linear conveying system 260 is similar to the linear conveying system 160 of FIG. 1, including a linear path 262 and multiple pallet-carrying vehicles 264a-b. A difference is that linear conveying system 260 is adapted to stop at more receiving/providing pallet stations than the FIG. 1 counterpart.

The left-most conveying system 270 is similar to the left-most conveying system 170 of FIG. 1. A pallet from a different level can be carried by a vertical lift to lift station 266a, at which point the pallet moves upwards (in FIG. 3A) to the transfer conveying lane 274, which passes the pallet to the pallet manipulation system 266, which can remove layers of cases from and add layers of cases to pallets using a gantry crane. A difference from FIG. 1 is that the transfer conveying lane 274 interfaces with a multi-station interfacing lane 320 that can route pallets up and down (in FIG. 3A) to any of four stations that are adapted to provide pallets to the pallet manipulation system 266.

A return lane 276 is adapted to receive pallets from the pallet manipulation system 266. The return lane 276 includes a pallet wrapping station 322 and a station 324 at which a laser curtain measures external dimensions of a pallet at the station 324. Pallets that do not satisfy certain criteria (e.g., presence of a readable label, and having acceptable dimensions), are routed downward (in FIG. 3A) by rework lane 278, which is surrounded by a raised platform on which human workers can stand and rework a pallet.

Pallets that satisfy the criteria are routed by conveyer lanes 326 and 328 to the linear conveying system 260. A pallet-moving vehicle will retrieve the pallet and either take it to (1) one of the conveying lanes 253a-h, to return to storage via the upper level, or (2) the receiving station 271, to be taken to the lower level and returned to storage via the lower level.

Pallets can also be routed to vertical conveying lane 330, to be routed through either of the pallet-building lanes 332a-b, which include build stations at which pallets are raised up to a higher level and individual cases are placed onto the pallet by human workers, before the pallet is lowered back down to lanes 332a-b, where the pallets proceed on and are wrapped at wrapping stations.

The middle conveying system 280 is similar to the left-most conveying system 180 of FIG. 1. A pallet from a different level can be carried by a vertical lift to lift station 266b, at which point the pallet moves upwards (in FIG. 3B) to the pallet routing station 282, which selectively routes the pallet to the left or right (in FIG. 3B), based on whether the warehouse control system has designated the destination for the pallet as pallet manipulation system 266 or pallet manipulation system 268, both of which can remove layers of cases from and add layers of cases to pallets using a gantry crane.

Should the pallet routing station 282 route the pallet to the right, the pallet is moved by conveying lane 340 to conveying lane 342, which moves the pallet up to transfer conveying lane 284b, which passes the pallet to the pallet manipulation system 268. A difference from FIG. 1 is that the transfer conveying lane 284b interfaces with a multi-station interfacing lane 344b that can route pallets up and down (in FIG. 3B) to any of four stations that are adapted to provide pallets to the pallet manipulation system 268.

A return lane 286 is adapted to receive pallets from the pallet manipulation system 268. The return lane 286 includes a pallet wrapping station 346 and a station 348 at which a laser curtain measures external dimensions of a pallet at the station 348. Pallets that do not satisfy certain criteria (e.g., presence of a readable label, and having acceptable dimensions), are routed upward (in FIG. 3B) by rework lane 288, which is surrounded by a raised platform on which human workers can stand and rework a pallet.

Pallets that satisfy the criteria are routed downward (in FIG. 3B) by conveying lane 350. The warehouse control system can either: (1) direct the conveying system to leave the pallet in wait at station 289, for a pallet-moving vehicle to retrieve the pallet and take the pallet to any of the conveying lanes 253*a-h*, to return to storage via the upper level, or (2) direct the conveying system to move the pallet to the left (in FIG. 3B) to the lift station 266*b*, to be taken to the lower level and returned to storage via the lower level.

The middle conveying system 280 is largely symmetric, with components forming a right half of the conveying system 280 having corresponding components to a left half of the conveying system 280. The left and right halves share only a single, central lane that includes a receiving station 281, the lift station 266*b*, and the routing station 282. Pallets that are routed to the left by the routing station 282 are conveyed by conveying components the same as those described with respect to the right half of the system, except as noted below.

A difference is that the multi-station interfacing lane 344*a* includes a station 350 that connects to the linear conveying system 260, to both provide pallets to the linear conveying system 260 and receive pallets from the linear conveying system. Also, a lift station 266*e* is configured to receive pallets from and provide pallets to the lower level. (The corresponding lower-level lift station is not illustrated in FIGS. 2A-B.) Pallets received from the lower level and linear conveying system 260 can be directed upwards (in FIG. 3B) by the multi-station interfacing lane 344*a* to the pallet manipulation system 266. Pallets transferred down the multi-station interfacing lane 344*a* (coming either from the pallet manipulation system 266 or the case weighing station 360) can be provided to either the linear conveying system 260 or the lift station 266*e*.

Another difference between the left and right sides of the middle conveying system 280 is that the left side connects to a case weighing system 360. Specifically, an intake conveying lane 361 of the case weighing system 360 receives pallets from the transfer conveying lane 284. The intake conveying lane 361 transfers pallets to either case weighing lane 362*a* or case weighing lane 362*b*. Each lane includes a station 364*a*, 364*b* at which a pallet is raised vertically to a station at which humans remove cases from the pallet, after which the at least partially emptied pallet is lowered vertically and conveyed along a remainder of the respective weighing lane 362*a*, 362*b*.

Each weighing lane 362*a*, 362*b* also includes a re-stacking station 366*a*, 366*b* at which an at least partially emptied pallet is raised vertically, cases are stacked onto the pallet after the cases have been weighed and weights assigned to each level of the pallet (the cases conveyed are conveyed from their original removal location at a height above the weighing lanes 366*a*, 366*b*), and the re-stacked pallet is lowered vertically and conveyed further along the respective weighting lane 362*a*, 362*b*. Restacked pallets are then returned to the middle conveying system 280 by return lanes 368 and 370. The middle conveying system 280 routes pallets received from the case weighing system 360 through a pallet wrapper before returning the wrapped pallet to storage via either the upper level (using the linear conveying system 260) or the lower level (using either of lift stations 266*e* and 266*b*).

The right-most conveying system 290 is similar to the right-most conveying system 190 of FIG. 1. A pallet from a different level can be carried by a vertical lift to either of lift stations 266*c* or 266*d*, at which point the pallet moves upwards (in FIG. 3C) by a corresponding lift-receiving conveying lane 292*a*, 292*b*. The pallet is moved onto a transfer conveying lane 294, which passes the pallet to the pallet manipulation system 268. A difference from FIG. 1 is that the lift-receiving conveying lanes 292*a* and 292*b* each end with a pallet-storing station 282*a* and 282*b* at which a pallet can be stored (e.g., with a box thereon to receive plastic wrap from pallets that are unwrapped by human workers while the pallets are on lift-receiving conveying lanes 292*a* and 292*b*.

The transfer conveying lane 294 interfaces with a multi-station interfacing lane 384 that can route pallets up and down (in FIG. 3C) to any of six stations that are adapted to provide pallets to and receive pallets from the pallet manipulation system 268.

A return lane 296 is adapted to receive pallets from the pallet manipulation system 268. The return lane 296 includes a pallet wrapping station 386 and a station 296 at which a laser curtain measures external dimensions of a pallet at the station 296. Pallets that do not satisfy certain criteria (e.g., presence of a readable label, and having acceptable dimensions), are routed upward (in FIG. 3C) by rework lane 298, which is surrounded by a raised platform on which human workers can stand and rework a pallet.

Pallets that satisfy the criteria are routed by conveyers return lane 296 to lift-providing lanes that service the lift stations 266*c* and 266*d*, via which the pallet will be returned to the lower level and thereafter to storage.

Figure 4:
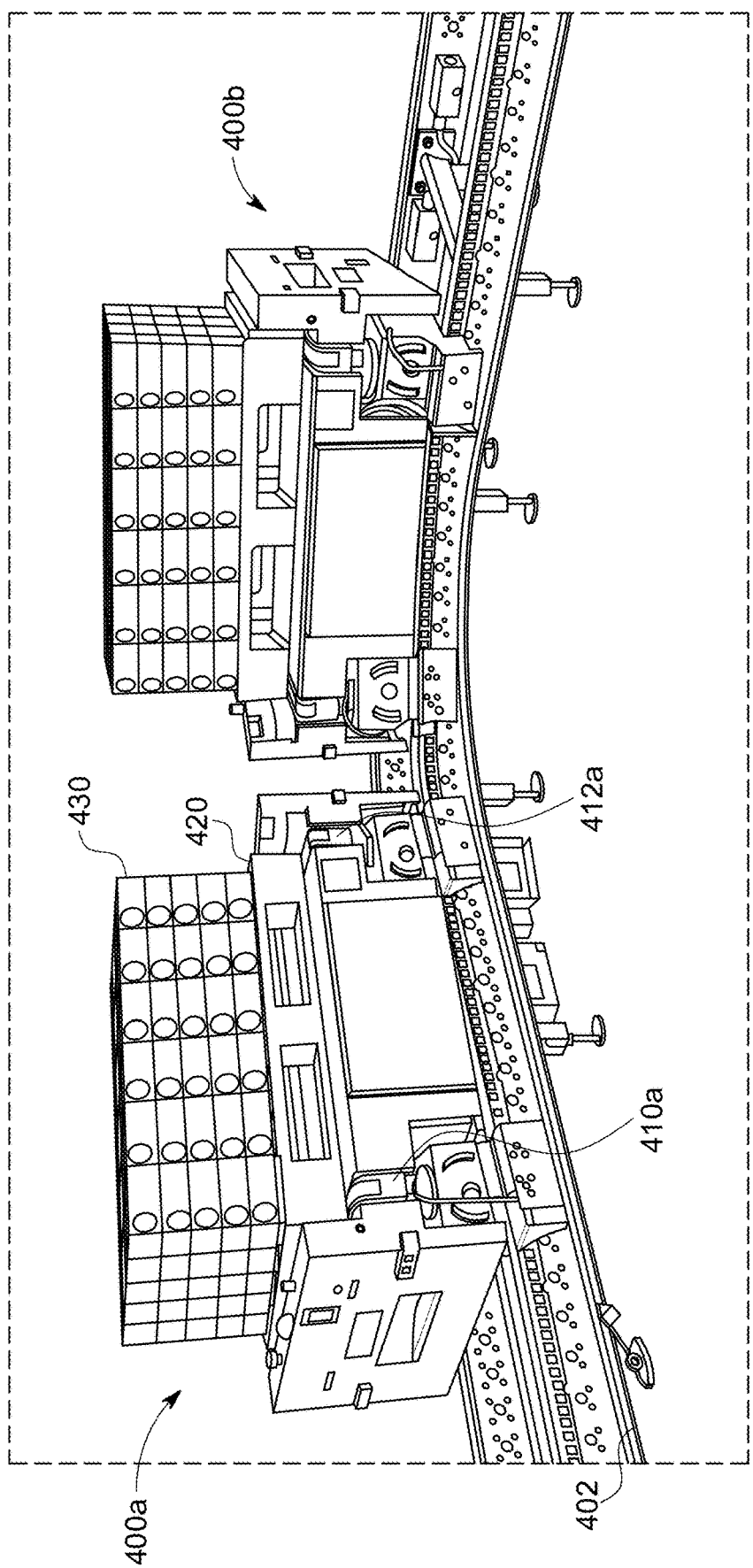
FIG. 4 illustrates an example of rail guided vehicles (RGVs) on a rail system.

FIG. 4 illustrates an example of rail guided vehicles (RGVs) on a rail system. The RGVs can be used for the pallet-moving vehicles described throughout this document (e.g., vehicles 114*a-c*, 164*a-b*, 214*a-b*, and 264*a-b*). In the present example, RGV 400*a* can be configured to travel through a warehouse along a rail 402, independently from other RGVs (e.g., RGV 400*b*). The RGVs (e.g., RGV 400*a*) shown in the present example include pallet conveying devices 410*a* and 412*a*. The pallet conveying devices 410*a*, 412*a*, for example, can be configured to enable the RGV 400*a* to receive, support, and provide a pallet 420, which can include various loading goods (e.g., goods 430).

To pick up pallet 420, for example, the RGV 400*a* can move along the rail 402 and stop at a pallet providing station (e.g., any of the pallet providing stations or pallet stands described throughout this document) that is to release a pallet. The pallet providing station, for example, can roll off the pallet 420 while the RGV 400*a* rolls on the pallet (e.g., by activating its pallet conveying devices 410*a*, 412*a*), until the pallet is positioned correctly on the RGV 400*a*.

To drop off pallet 420, for example, the RGV 400*a* can move along the rail and stop at a pallet receiving station (e.g., any of the pallet receiving stations or pallet stands described throughout this document) that is to accept a pallet. The pallet receiving station, for example, can roll on the pallet while the RGV 400*a* rolls off the pallet (e.g., by activating its pallet conveying devices 410*a*, 412*a*), until the pallet is positioned correctly on pallet receiving station. Pallets can be received or provided from either side of the RGV 400*a*, for example.

Figure 5:
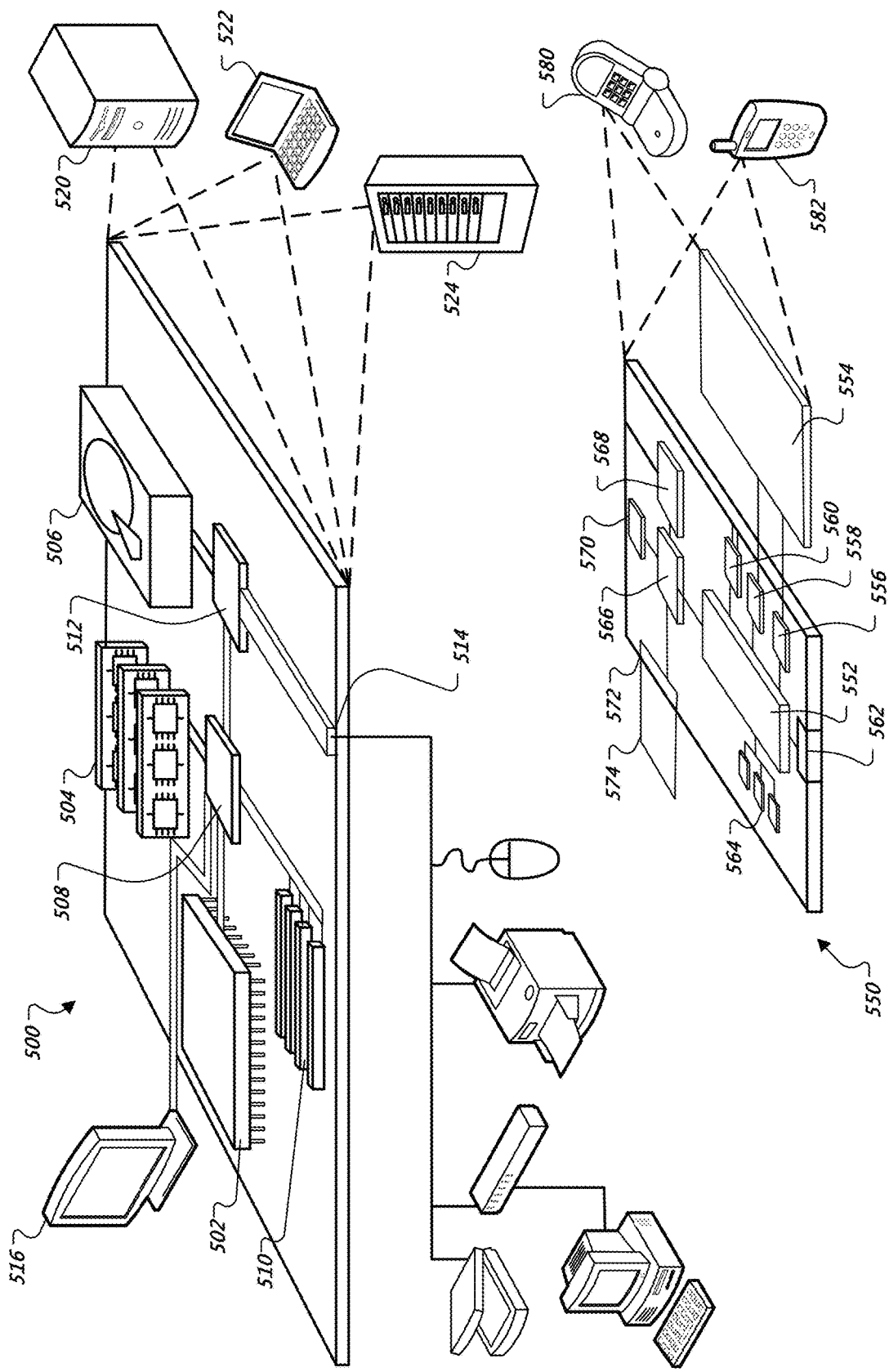
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed controller 508 connecting to memory 504 and high-speed expansion ports 510, and a low speed controller 512 connecting to low speed expansion port 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A multi-level pallet-conveying system for a storage facility, comprising:
a first-level conveying system adapted to move pallets on a first level of the storage facility;
a first-level into-storage conveying lane adapted to receive pallets from the first-level conveying system and provide such pallets to a first-level station of a storage lifting system that is adapted to move pallets to and receive pallets from storage locations;

a first-level from-storage conveying lane adapted to receive pallets from the first-level station of the storage lifting system and provide such pallets to the first-level conveying system;

a second-level conveying system adapted to move pallets on a second level of the storage facility that is above the first level of the storage facility;

a second-level into-storage conveying lane adapted to receive pallets from the second-level conveying system and provide such pallets to a second-level station of the storage lifting system;

a second-level from-storage conveying lane adapted to receive pallets from the second-level station of the storage lifting system and provide such pallets to the second-level conveying system; and a wall that separates a storage portion of the storage facility from a docking portion of the storage facility, to maintain the storage portion of the storage facility at a first atmospheric temperature and the docking portion of the storage facility at a second atmospheric temperature that is higher than the first atmospheric temperature, wherein the wall comprises (i) at least one first-level opening for passage of the respective first-level conveying lanes, and (ii) at least one second-level opening for passage of the respective second-level conveying lanes.

2. The multi-level pallet-conveying system of claim 1, wherein the storage lifting system comprises a crane that is adapted to both move pallets down an aisle and elevate pallets to any of multiple different levels along both sides of the aisle.

3. The multi-level pallet-conveying system of claim 1, wherein the first-level conveying system comprises a loop and multiple vehicles that are adapted to move pallets around the loop.

4. The multi-level pallet-conveying system of claim 3, wherein the second-level conveying system comprises a linear conveying system that includes a linear path and a bi-directional pallet-conveying vehicle adapted to move pallets back and forth on the linear path.

5. The multi-level pallet-conveying system of claim 4, wherein:

the loop comprises a rail loop and the multiple vehicles comprise rail-guided vehicles; and the linear path comprises a linear rail and the bi-directional pallet-conveying vehicle comprises a bi-directional rail-guided vehicle.

6. The multi-level pallet-conveying system of claim 4, comprising:

an inbound conveying lane that is adapted to receive pallets from human-operated pallet-moving vehicles with access to docked trailers and provide such pallets to the multiple vehicles of the first-level conveying system;

an outbound conveying lane that is adapted to receive pallets from the multiple vehicles of the first-level conveying system and provide such pallets to human-operated pallet-moving vehicles with access to docked trailers.

7. The multi-level pallet-conveying system of claim 4, comprising:

a conveying-system lift adapted to move pallets between the first level of the storage facility and the second level of the storage facility, the conveying-system lift including a first-level conveying-system lift station adapted to receive pallets from the first-level conveying system and a second-level conveying-system lift station adapted to receive pallets from the second-level conveying system.

8. The multi-level pallet-conveying system of claim 7, wherein the first-level conveying-system lift station is located on the first level of the storage facility within the loop of the first-level conveying system.

9. The multi-level pallet-conveying system of claim 8, wherein:

the second-level into-storage conveying lane interfaces with the path of the second-level conveying system on a first side of the second-level conveying system;

the second-level from-storage conveying lane interfaces with the path of the second-level conveying system on the first side of the second-level conveying system; and the second-level conveying-system lift station is located on a second side of the path of the second-level conveying system, the second side of the path being opposite the first side of the path.

10. The multi-level pallet-conveying system of claim 1, wherein:

the second-level into-storage conveying lane is located directly above the first-level into-storage conveying lane; and the second-level from-storage conveying lane is located directly above the first-level from-storage conveying lane.

11. The multi-level pallet-conveying system of claim 1, wherein:

the first-level into-storage conveying lane passes through a first first-level opening in the wall;

the first-level from-storage conveying lane passes through a second first-level opening in the wall;

the second-level into-storage conveying lane passes through a first second-level opening in the wall;

the second-level from-storage conveying lane passes through a second second-level opening in the wall.

12. The multi-level pallet-conveying system of claim 1, wherein:

the first atmospheric temperature is below freezing; and the second atmospheric temperature is above freezing, and at least fifteen degrees above the first atmospheric temperature.

13. A pallet-conveying system for a storage facility, comprising:

a linear conveying system that includes a linear path and a bi-directional pallet-conveying vehicle adapted to (i) receive pallets from and provide pallets to multiple interfacing stations positioned along the linear path at a first side of the bi-directional vehicle, (ii) move back and forth along the linear path while conveying pallets, and (iii) provide pallets to at least one receiving station that is positioned along the linear path at a second side of the bi-directional vehicle that is opposite the first side of the bi-directional vehicle, wherein the bi-directional vehicle remains on the linear path while receiving pallets, conveying pallets, and providing pallets;

a storage conveying system adapted to move pallets between the linear path and a storage portion of the facility, the storage conveying system including the multiple interfacing stations positioned along the linear path at which the storage conveying system is adapted to receive pallets from and provide pallets to the bi-directional pallet-conveying vehicle of the linear conveying system, the multiple interfacing stations of the storage conveying system being located along a first side of the linear path that is served by the first side of the bi-directional pallet-conveying vehicle;

a lift station adapted to interface with a lift that travels vertically between different levels of the storage facility, including a particular level at which the lift station is located, the lift station being located on a second side of the linear path that is opposite the first side of the linear path; and a lift-providing conveying lane adapted to move pallets to the lift station from a receiving station that is part of the lift-providing conveying lane and that is adapted to receive pallets from the second side of the bi-directional pallet-conveying vehicle of the linear conveying system.

14. The pallet-conveying system of claim 13, wherein:
the linear path comprises a rail; and
the bi-directional pallet-conveying vehicle comprises a rail-guided vehicle.

15. The pallet-conveying system of claim 13, comprising:
a lift-receiving conveying lane adapted to move pallets away from the lift station;
a transfer conveying lane adapted to receive pallets from the lift-receiving conveying lane and move such pallets to a destination system.

16. The pallet-conveying system of claim 15, comprising:
a return conveying lane that is adapted to receive pallets from the destination system and move such pallets to the bi-directional pallet-conveying vehicle on the linear path of the linear conveying system.

17. The pallet-conveying system of claim 16, comprising:
a rework conveying lane that is adapted to receive pallets from the return conveying lane that do not satisfy criteria for proceeding to the linear conveying system, and provide such pallets to the transfer conveying lane.

18. The pallet-conveying system of claim 13, wherein the storage conveying system includes:
an into-storage conveying lane adapted to receive pallets from the bi-directional pallet-conveying vehicle on the linear path of the linear conveying system;
an into-storage routing station adapted to receive pallets from the into-storage conveying lane and selectively provide such pallets to either of a first lifting system and a second lifting system;
a from-storage routing station adapted to selectively receive pallets from either of the second lifting system and a third lifting system; and a from-storage conveying lane adapted to receive pallets from the from-storage routing station and provide such pallets to the bi-directional pallet-conveying vehicle on the linear path of the linear conveying system.

19. The pallet-conveying system of claim 18, wherein the storage conveying system includes:
a second into-storage conveying lane adapted to receive pallets from the bi-directional pallet-conveying vehicle on the linear path of the linear conveying system at a different location than the into-storage conveying lane;
a second into-storage routing station adapted to receive pallets from the second into-storage conveying lane and selectively provide such pallets to either of the third lifting system and a fourth lifting system;
a second from-storage routing station adapted to selectively receive pallets from either of the fourth lifting system and a fifth lifting system; and
a second from-storage conveying lane adapted to receive pallets from the second from-storage routing station and provide such pallets to the bi-directional pallet-conveying vehicle on the linear path of the linear conveying system.

20. The pallet-conveying system of claim 18, wherein:
the first lifting system comprises a first crane that is adapted to both move pallets down a first aisle and elevate pallets to any of multiple different levels along the first aisle;
the second lifting system comprises a second crane that is adapted to both move pallets down a second aisle and elevate pallets to any of the multiple different levels along the second aisle; and
the third lifting system comprises a third crane that is adapted to both move pallets down a third aisle and elevate pallets to any of the multiple different levels along the third aisle.

21. The pallet-conveying system of claim 13, wherein the particular level is above a ground-floor level of the storage facility.

22. The pallet-conveying system of claim 13, wherein the linear conveying system includes a second bi-directional pallet-conveying vehicle adapted to move pallets back and forth on the linear path.

* * * * *